Patented Aug. 24, 1943

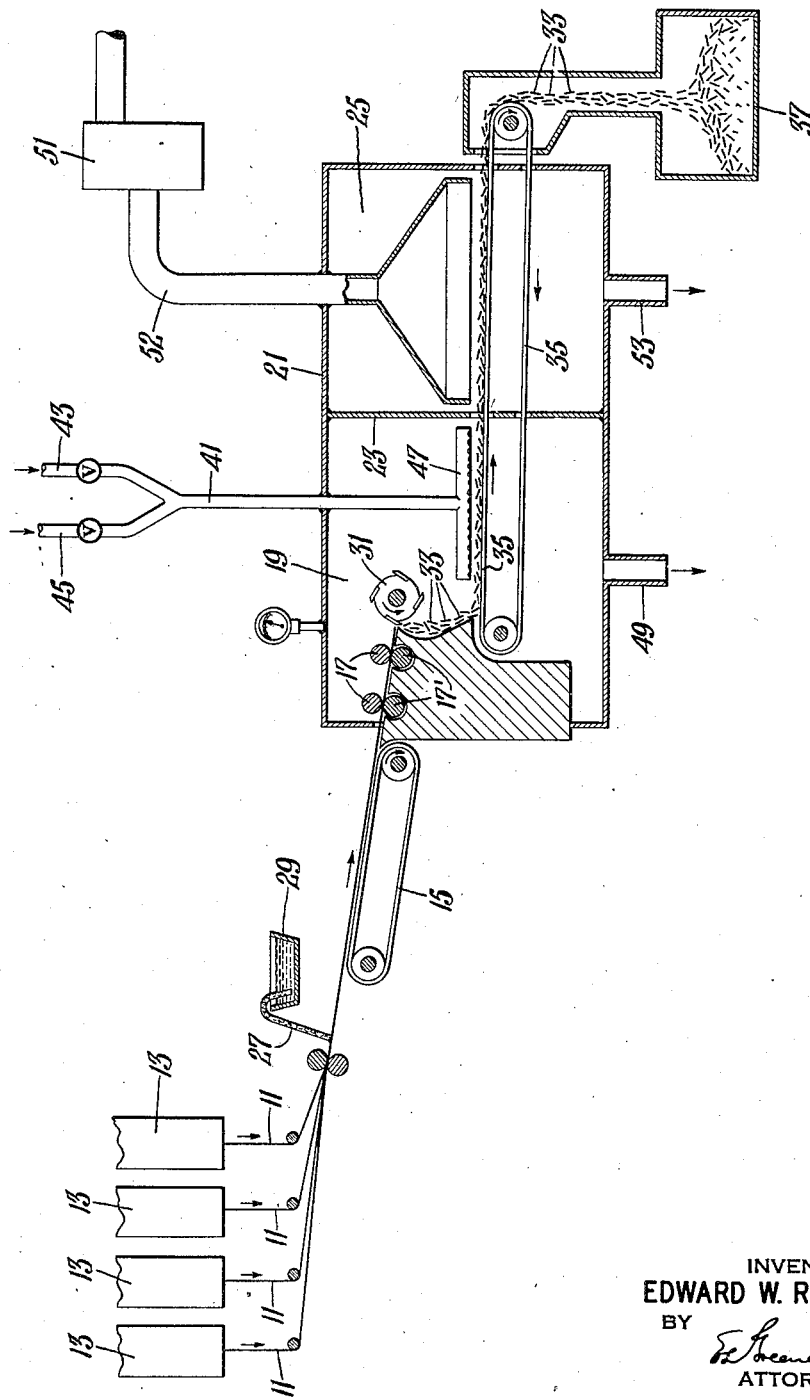

2,327,460

UNITED STATES PATENT OFFICE 2,327,460

PROCESS FOR STAPLING AND CRIMPING SYNTHETIC TEXTILE FIBERS

Edward W. Rugeley, Charleston, W. Va., assignor to Carbide and Carbon Chemicals Corporation, a corporation of New York Application May 10, 1939, Serial No. 272,795

9 Claims. (Cl. 18—54)

This invention relates to the art of producing artificial textile fibers, and it is particularly directed to the stapling and crimping of fibers made from the vinyl resins.

Of these, the invention is especially directed to the simultaneous stapling and crimping of filaments made from water-insoluble vinyl resins, particularly those which may result from the conjoint polymerization of vinyl halides with vinyl esters of alphatic acids, and preferably containing between about 70% and about 95% by weight of vinyl halide in the polymer. The resins which are preferred are made by the conjoint polymerization of vinyl chloride with vinyl acetate, and contain between about 70% and about 95% by weight of vinyl chloride in the polymer.

Due to the thermoplasticity of the vinyl resins, staple fibers made from them may be combined with other artificial and natural fibers and fused thereto to provide materials of marked crease resistance and retention of shape. For this purpose the fibers are made from vinyl resins of relatively low softening point, in order that later fusion to the other fibers will not require temperatures sufficiently high as to injure the other fibers. Since it is more important to have fibers of low fusion point rather than exceptional strength, for this purpose, the vinyl resins of relatively low macromolecular weight are employed. However, resins of extremely low average macromolecular weight are very difficult to spin into filaments, so that the lower limit is about 7500. On the other hand, where the staple fibers are not to be used, but are to be carded and spun into yarn, either alone or mixed with other artificial or natural fibers, higher softening points and greater strength are desired. For this purpose, the vinyl resin from which the fibers are made should have an average macromolecular weight of at least about 15,000 and should preferably be substantially free from the very low molecular weight polymers. The upper limit is determined only by the dispersibility of the resins in suitable solvents to produce a spinnable dispersion or "dope." Molecular weights referred to herein are those calculated by means of Staudinger's formula from viscosity determinations of solutions of the resins.

The preparation and treatment of fibers and filaments composed of the resins resulting from the conjoint polymerization of vinyl halides with vinyl esters of aliphatic acids are described in United States Patent No. 2,161,766 issued June 6, 1939, to E. W. Rugeley, T. A. Feild, Jr., and J. F. Conlon, with which this application contains material in common.

The conventional method of preparing staple yarn from artificial fibers is to cut the continuous filaments into short lengths, to card masses of these loose, short fibers, and to spin the carded fibers into yarn. Such a method can be employed with the vinyl resin fibers, but the staple fibers become very difficult to handle during the cutting, or stapling, because the high dielectric strength of the vinyl resins permits the accumulation of static electrical charges on them, and this causes the fibers to repel one another and to adhere to all parts of the stapling machines. In addition, yarn made from these staple fibers does not have as high a strength as do some of the natural yarns because the individual fibers are straight and smooth, and they do not interlock to give the desired tenacity to the carded yarn.

By the process of this invention, staple yarns of satisfactory strength may be made from filaments of the vinyl resins, and the filaments may be stapled and crimped easily and economically on a commercial scale.

Filaments sufficiently fine for use in textiles may be made from the vinyl resins by extrusion of the resin through fine orifices, and collection of the threads thus formed. The resin must, of course, be in a plastic state in order to effect the extrusion or spinning of the resin into threads, and the most practical method of achieving this is to disperse (or dissolve) the resin in a volatile solvent. In the case of the resins made by the conjoint polymerization of vinyl halides with vinyl esters of aliphatic acids, preferably containing between about 70% and about 95% by weight of the vinyl halide in the polymer, the resin may be dispersed in warm dry acetone, or in other liquids from which filaments may be formed in the spinning operation. By "dry" acetone is meant acetone which contains less than about 0.60% by weight of water. It has been found that, when the acetone used contains water in excess of this amount, the quality of the resin dispersion is materially impaired, and solutions made from such solvents can be filtered and spun only with great difficulty. The concentration of the vinyl resin in the spinning solution is dependent upon and varies inversely with the macromolecular weight of the resin, but the resin content ordinarily employed using acetone as the solvent is 30% or less by weight. The resulting "dope" is a clear, heavily gelatinous, non-flowing, plastic mass at room temperature, while at a temperature of 50° C. it assumes a very viscous, slowly flowable state.

In the practice of this invention, the spinning, or filament extrusion, operation may be carried out in equipment customarily employed for so-called "dry-spinning" of other types of filaments.

The fibers obtained directly from the spinning cell elongate considerably when subjected to relatively low tension. Where this is undesirable, the fibers may be stretched as they come from the spinning cell and still retain some residual solvent. Stretching under these conditions does not increase the ultimate tenacity of the fibers to the extent possible by stretching the filaments in the absence of residual solvent, but it materially reduces the elongation of the fibers when subjected to tension. If exceptionally strong fibers are desired, the filaments are stretched after removal of residual solvent. The filaments which are stretched in the absence of residual solvent will slowly tend to resume their original length upon release of the tension, due to their natural elasticity, so that where there is a protracted period of time between the spinning of the fibers and the stapling and crimping operation, it is desirable to "set" the stretch imparted to these filaments, or stabilize the latter, by aging them under tension. Increasing the temperature at which the filaments are stabilized shortens the time required to set the stretch imparted thereto, and temperatures from about 60° to about 80° C. are preferred. The stretching and stabilizing of filaments made from vinyl resins are described in the above-mentioned United States Patent No. 2,161,766. After stabilization, the filaments may be fed to a stapling machine wherein they are cut into short lengths and gathered in loose, fluffy masses for carding. On the other hand, if the fibers are not to be stabilized, they are fed directly to the stapling machine after stretching, or if unstretched, directly from the spinning cell to the stapling machine.

The conditions under which the stapling of the continuous filaments is conducted constitute the essence of the invention. If the filaments are cut or stapled directly as they come from the spinning cell, it is essential for the process of this invention that the fibers contain some residual solvent during stapling, and the solvent employed must be one which is at least partially water-miscible. The amount of residual solvent is not critical, but it should be materially less than that which would render the filaments so soft or tacky as to permit them to coalesce or adhere to each other. In general, between about 5% and about 20% of residual solvent, based on the weight of the resin, should be present. The stapling operation is conducted either in an atmosphere of steam, or in such a manner that the stapled fibers are placed in the steam atmosphere immediately after being cut. If the stapling operation itself is in the steam atmosphere, difficulty may be encountered in that the temperature of the equipment becomes so high that the cut ends of the filaments may adhere to each other. Therefore, it usually is better practice to cut the filaments while dry and then immediately to feed the stapled fibers into an atmosphere consisting largely of steam. By means of the steam, static electrical charges on the fibers are dissipated and the residual solvent, due to its partial or complete water-miscibility, is eliminated from the filaments with the result that a definite contraction, crimping and partial delustering of the staple fibers takes place. This crimping is highly desirable, if not actually necessary, in order to produce yarns of good strength, for the reasons already mentioned.

The stretched fibers are stapled in exactly the same way, and under the same conditions, as described above for the unstretched filaments, except that the stretched fibers may not contain any appreciable amount of residual solvent. It is unnecessary for the stretched fibers to contain residual solvent in order to become crimped upon being subjected to the steam because the internal stresses imparted to the filaments by the stretching operation are released by the steam, and the stapled fibers shrink and become crimped. If the stretched fibers are to be stabilized prior to stapling, it is important that they should be stabilized at a temperature below that of the steam employed in the stapling operation, for if the fibers are stabilized above the temperature of the steam, they will not become crimped upon stapling in the steam atmosphere.

On handling, the fibers will accumulate a static electrical charge as soon as they have become thoroughly dry, following the stapling operation. This may be prevented by spraying the stapled fibers with a static-eliminating agent, such as the various glycols, or glycerine and the like, or the continuous filaments may be passed in contact with a wick or roller which is partly immersed in the static-eliminating agent, prior to the stapling operation. The latter method of preventing static electrical charges does not interfere with the crimping of the fibers or solvent removal therefrom during the stapling operation.

In the accompanying drawing, which shows diagrammatically certain apparatus adapted for use in performing one modification of the process for continuously stapling and crimping vinyl resins of the invention, continuous filaments 11 of vinyl resin are withdrawn from the respective dry-spinning cells 13 of well known type, and are conducted in the form of a multiple thread tow by the belt-conveyor 15 or the equivalent to constant feed rolls, 17, 17' and thence to the stapling and crimping chamber 19 of a fluid-tight housing 21. The latter is separated by a partition 23 into the aforesaid stapling chamber 19 and a drying chamber 25. A wick 27, fed from a reservoir 29, feeds to the filaments 11 a small amount of a static-eliminating agent, such as those named herein, as the filaments move to the stapling chamber. A rotary cutter 31 of well-known type in chamber 19 cuts each of the filaments 11 into short staple lengths 33; and these fibers are deposited on belt conveyor 35 which extends through openings in partition 23 and through openings in the opposite end of the wall of chamber 25, and conducts the dried fibers to a storage bin or baler 37. For treating the staple fibers, as formed, with steam, or an atmosphere consisting largely of steam, a conduit 41 having valve-controlled steam and air supply lines 43, 45 connected therewith, has a manifold 47 provided with perforations facilitating discharge of such fluid upon the mass of fibers on the conveyor 35. The steam and/or air leaves chamber 19 through conduit 49.

For drying the staple fibers, dry air or the like may be heated, as by the heater 51, and introduced through conduit 52 to the mass of fibers disposed upon conveyor 35. The resultant vapors may be removed through conduit 53.

The same type of apparatus is useful for stapling and crimping stretched filaments and yarn, in which case the stretched yarn is withdrawn from grouped containers or bobbins, and fed onto the conveyor 15 in the form of a tow.

Apparatus arrangements other than that shown may also be used for performing the present process. Thus, the rotary cutter 31 advantageously may be disposed outside of chamber 19, and a conveyor employed to feed the stapled fibers into an atmosphere containing steam in chamber 19, and onto conveyor 35.

Although the invention has been described specifically with reference to the stapling of filaments of the vinyl resins which may result from the conjoint polymerization of vinyl halides with vinyl esters of aliphatic acids, and which contain between about 70% and about 95% by weight of the vinyl halide in the polymer and are of high average macromolecular weight, the invention is applicable to the stapling and crimping of filaments made from any vinyl resins which are water-insoluble and of sufficiently high macromolecular weight to permit spinning into textile filaments. The filaments must be capable of contraction in order that the crimping may be obtained upon contact with the steam, and they may be made capable of contraction either by stretching the filaments or by permitting some residual solvent from the spinning operation to remain in the fibers during the stapling operation. As examples of other suitable resins there may be mentioned the polyvinyl acetal types, particularly the polyvinyl partial acetal resins which are water-insoluble and contain unreacted polyvinyl hydroxyl groups and acetal linkages with aliphatic aldehydes having from two to six carbon atoms in the molecule.

Although most satisfactory results are obtained when the stapling of the filaments is done in an atmosphere of pure steam under atmospheric pressure, higher temperatures may be employed if stapling equipment is used which is designed to operate under superatmospheric pressure. On the other hand, temperatures below 100° C. may be employed by using a mixture of air and steam, so that there will not be appreciable condensation of water upon the fibers. Should such condensation take place, the fibers can very easily be dried prior to carding, inasmuch as the strength of these vinyl resin fibers is unaffected by water. Large quantities of air mixed with the steam should be avoided inasmuch as this causes excessive lowering of the temperature to which the fibers are exposed, with consequent lessening of the crimping obtained, and if the fibers contain residual solvent, incomplete removal of the residual solvent therefrom.

Many modifications will be apparent to those skilled in the art, and the invention should not be limited other than as defined in the appended claims.

I claim:

1. The process of forming stapled and crimped textile fibers from a continuous uncrimped filament of a water-insoluble vinyl resin, which filament is capable of contraction upon exposure to an atmosphere consisting at least largely of steam, which comprises cutting such a filament into a plurality of short stapled fibers that are unshrunk and capable of contraction, while the filament contains a solvent for the resin which is at least partially miscible with water, but which is present in amount insufficient to render the resultant fibers tacky when exposed to an atmosphere consisting at least largely of steam, and immediately subjecting said fibers to an atmosphere consisting at least largely of steam whereby the staple fibers are shrunk and highly crimped.

2. The process of forming staple crimped textile fibers from a continuous uncrimped filament of a water-insoluble vinyl resin, which filament is capable of contraction when subjected to heat below the softening point of the resin, which comprises continuously cutting successive portions of such a filament into a plurality of short staple fibers, while the filament contans a solvent for the resin which is at least partially miscible with water, but which is present in amount insufficient to render the resultant fibers tacky when exposed to an atmosphere consisting at least largely of steam, and concurrently subjecting such fibers as formed to an atmosphere consisting at least largely of steam, whereby staple fibers are concurrently formed, shrunk and crimped.

3. The process of forming staple crimped textile fibers from a continuous uncrimped filament of a water-insoluble vinyl resin, which filament is capable of contraction upon the application of heat, which comprises cutting such a filament into short lengths while the filament contains a solvent for the resin which is at least partially miscible with water but which is present in amount insufficient to render the resultant fibers tacky when exposed to an atmosphere consisting largely of steam, and immediately subjecting the staple fibers thus produced to an atmosphere consisting largely of steam.

4. The process of forming staple crimped textile fibers from a continuous uncrimped filament of a water-insoluble vinyl resin, which filament is capable of contraction upon the application of heat, which comprises cutting such a filament into short lengths while the filament contains between about 5% and about 20% by weight of acetone, and immediately subjecting the staple fibers thus produced to an atmosphere consisting largely of steam.

5. The process of stapling and crimping stretched textile filaments made from a water-insoluble vinyl resin, which comprises cutting such a stretched filament into short lengths while the filament contains a solvent for the resin which is at least partially miscible with water but which is present in amount insufficient to render the resultant fibers tacky when exposed to an atmosphere consisting at least largely of steam, and immediately subjecting the fibers to an atmosphere consisting at least largely of steam.

6. The process of forming staple crimped textile fibers from a continuous uncrimped filament of a water-insoluble vinyl resin having an average macromolecular weight of at least 7500, which filament is capable of contraction upon the application of heat, which comprises cutting such a filament into short lengths while the filament contains a solvent for the resin which is at least partially miscible with water but which is present in amount insufficient to render the resultant fibers tacky when exposed to an atmosphere consisting largely of steam, and immediately subjecting the staple fibers thus produced to an atmosphere consisting at least largely of steam.

7. The process of stapling and crimping stretched textile filaments made from vinyl resins substantially identical with those which may result from the conjoint polymerization of vinyl halides with vinyl esters of aliphatic acids, and having an average macromolecular weight of at least 7500, which comprises cutting said stretched filaments into short lengths while the filaments contain a solvent for the resin which is at least partially miscible with water but which is present in amount insufficient to render the resultant fibers tacky when exposed to an atmosphere consisting at least largely of steam, and immediately subjecting them to an atmosphere consisting at least largely of steam.

8. The process of making crimped staple fibers from vinyl resins having average macromolecular weights of at least 15000 which are substantially identical with those which may result from the conjoint polymerization of vinyl halides with vinyl esters of aliphatic acids, and which contain between about 70% and about 95% by weight of vinyl halide in the polymer, which comprises spinning the vinyl resin into continuous filaments by extrusion into an evaporative atmosphere of a dispersion of the resin in a solvent which is at least partially miscible with water, cutting the freshly spun filaments containing some residual solvent into short lengths and immediately subjecting the resultant staple fibers to an atmosphere consisting at least largely of steam.

9. The process of making crimped staple fibers from a vinyl resin having an average macromolecular weight of at least 15,000 and resulting from the conjoint polymerization of vinyl chloride with vinyl acetate, and which resin contains between about 70% and about 95% by weight of vinyl chloride in the polymer, which comprises spinning the vinyl resin into at least one continuous filament by extrusion into an evaporative atmosphere of a dispersion of such resin in acetone, cutting into short lengths the freshly spun filament containing from about 5% to about 20% of residual acetone, based on the weight of the resin, and immediately subjecting the staple fibers thereby produced to an atmosphere consisting at least largely of steam.

EDWARD W. RUGELEY.